(12) United States Patent
Yamaguchi (10) Patent No.: US 11,372,412 B1
(45) Date of Patent: Jun. 28, 2022

(54) VESSEL STEERING SYSTEM AND VESSEL STEERING METHOD

(71) Applicant: YAMAHA HATSUDOKI KABUSHIKI KAISHA, Iwata (JP)

(72) Inventor: Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 357 days.

(21) Appl. No.: 16/827,838

(22) Filed: Mar. 24, 2020

Related U.S. Application Data (60) Provisional application No. 62/823,107, filed on Mar. 25, 2019.

(51) Int. Cl.
*G05D 1/02* (2020.01)
*B63H 25/02* (2006.01)

(52) U.S. Cl.
CPC .......... *G05D 1/0206* (2013.01); *B63H 25/02* (2013.01); *B63H 2025/026* (2013.01)

(58) Field of Classification Search
CPC . G05D 1/0206; B63H 25/02; B63H 2025/026
See application file for complete search history.

(56) References Cited

U.S. PATENT DOCUMENTS

| 8,589,004 | B1 | 11/2013 | Kanno | |
| 2010/0138083 | A1* | 6/2010 | Kaji | B63H 25/02 701/21 |
| 2011/0153125 | A1* | 6/2011 | Arbuckle | B63B 39/00 701/21 |
| 2011/0153126 | A1* | 6/2011 | Arbuckle | B63H 21/22 701/21 |
| 2011/0166724 | A1* | 7/2011 | Hiramatsu | B63H 25/42 702/85 |
| 2012/0276793 | A1* | 11/2012 | Minoura | B63H 11/107 440/43 |
| 2014/0046515 | A1* | 2/2014 | Mizutani | B63H 21/21 701/21 |
| 2015/0166159 | A1* | 6/2015 | Inoue | B63H 20/12 440/53 |

FOREIGN PATENT DOCUMENTS

JP 2014-073700 A 4/2014

\* cited by examiner

*Primary Examiner* — Richard M Camby
(74) *Attorney, Agent, or Firm* — Keating and Bennett, LLP (57) ABSTRACT

A system and method for steering a vessel includes correction by calibration with respect to displacement between a tilt direction of a joystick and a moving direction of the vessel. When receiving a command to start the calibration, a controller performs a calibration for right and left propulsion devices such that a tilt direction of a joystick is matched with a moving direction of a vessel. When performing a subsequent calibration, the controller additionally performs the calibration for the right and left propulsion devices to which the calibration has been previously applied.

12 Claims, 12 Drawing Sheets

VESSEL STEERING SYSTEM AND VESSEL STEERING METHOD

CROSS REFERENCE TO RELATED APPLICATIONS

This application claims the benefit of priority to U.S. Patent Application No. 62/823,107 filed on Mar. 25, 2019. The entire contents of this application are hereby incorporated herein by reference.

BACKGROUND OF THE INVENTION

1. Field of the Invention

The present invention relates to a vessel steering system and a vessel steering method.

2. Description of the Related Art

There has been conventionally known a vessel steering system for steering front, rear, right and left movements of a vessel by a joystick. For example, Japanese Laid-open Patent Publication No. 2014-73700 describes a vessel including a right outboard motor and a left outboard motor. When the joystick is tilted in a transverse direction, a controller of the vessel controls the right and left outboard motors in a transverse moving mode. In the transverse moving mode, the controller sets a steering angle of the right outboard motor and that of the left outboard motor such that the right and left outboard motors are oriented bilaterally opposite to each other such that each is slanted at a predetermined angle with respect to a back-and-forth direction of the vessel. Additionally, the controller sets one of a propulsive force of the right outboard motor and that of the left outboard motor to act in a forward moving direction, while setting the other to act in a rearward moving direction. With this setting, a net force of the propulsive forces of the right and left outboard motors acts in the transverse direction of the vessel, whereby the vessel is moved in the transverse direction.

When the joystick is tilted in the transverse direction and the back-and-forth direction, the controller similarly controls the right and left outboard motors in the transverse moving mode. In other words, the controller sets the steering angles and the directions of propulsive forces of the right and left outboard motors as described above. Additionally, the controller controls the propulsive forces of the right and left outboard motors such that the net force of the propulsive forces of the right and left outboard motors is oriented in a direction corresponding to a tilt direction of the joystick. Accordingly, the vessel is moved in the direction corresponding to the tilt direction of the joystick.

There are chances of producing an error in magnitude between the propulsive forces of the right and left outboard motors, since the propulsive forces of the right and left outboard motors are not necessarily completely matched with each other. Because of this, chances are that the direction of the net force of the propulsive forces of the right and left outboard motors is displaced from, without being matched with, the tilt direction of the joystick. In this case, the vessel is inevitably moved in a direction displaced from the tilt direction of the joystick.

To correct such displacement, it is preferred to perform calibration. However, in performing the calibration at present, a correction value obtained by the calibration previously performed is initialized. Because of this, even when the amount of displacement remaining after the previous calibration is small, it is required to perform the present calibration from the initial state. This makes a calibration work complicated. Other than this, when the amount of displacement is larger than an amount correctable by a one-time calibration, it is difficult to appropriately correct the displacement.

SUMMARY OF THE INVENTION

Preferred embodiments of the present invention provide appropriate correction by calibration with respect to displacement between a tilt direction of a joystick and a moving direction of a vessel while making the calibration work easy.

A system for steering a vessel according to a preferred embodiment of the present invention includes a left propulsion device, a left actuator, a right propulsion device, a right actuator, a joystick, and a controller. The left actuator is connected to the left propulsion device to change a steering angle of the left propulsion device. The right actuator is connected to the right propulsion device to change a steering angle of the right propulsion device. The joystick is operable in a tiltable manner. The controller receives a signal indicating a tilt direction of the joystick. When the joystick is tilted in a transverse direction, the controller controls the right and left propulsion devices as follows. The controller sets the steering angles of the right and left propulsion devices such that the right and left propulsion devices are oriented bilaterally opposite to each other such that each is slanted with respect to a back-and-forth direction of the vessel. The controller controls a propulsive force of the left propulsion device and a propulsive force of the right propulsion device such that a net force of the propulsive forces of the right and left propulsion devices is oriented in a direction corresponding to the tilt direction of the joystick. Upon receiving a command to start calibration, the controller performs the calibration for the right and left propulsion devices such that the tilt direction of the joystick is matched with a moving direction of the vessel. When performing the calibration a next time, i.e., a subsequent calibration, the controller additionally performs the calibration for the right and left propulsion devices to which the calibration has been previously applied.

A method according to another preferred embodiment of the present invention relates to a method executed by a controller for steering a vessel including a left propulsion device and a right propulsion device. The method includes a series of processes as follows. A first process relates to receiving a signal indicating a tilt direction of a joystick. A second process, executed when the joystick is tilted in a transverse direction, relates to setting a steering angle of the left propulsion device and a steering angle of the right propulsion device such that the right and left propulsion devices are oriented bilaterally opposite to each other such that each is slanted with respect to a back-and-forth direction of the vessel, and controlling a propulsive force of the left propulsion device and a propulsive force of the right propulsion device such that a net force of the propulsive forces of the right and left propulsion devices is oriented in a direction corresponding to the tilt direction of the joystick. A third process, executed when a command to start calibration is received, relates to performing the calibration for the right and left propulsion devices such that the tilt direction of the joystick is matched with a moving direction of the vessel. A fourth process, executed when a subsequent calibration is performed, relates to additionally performing the calibration for the right and left propulsion devices to which the calibration has been previously applied.

According to preferred embodiments of the present invention, a displacement between a tilt direction of a joystick and a moving direction of a vessel is appropriately corrected by calibration while the calibration is performed with a simple work.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
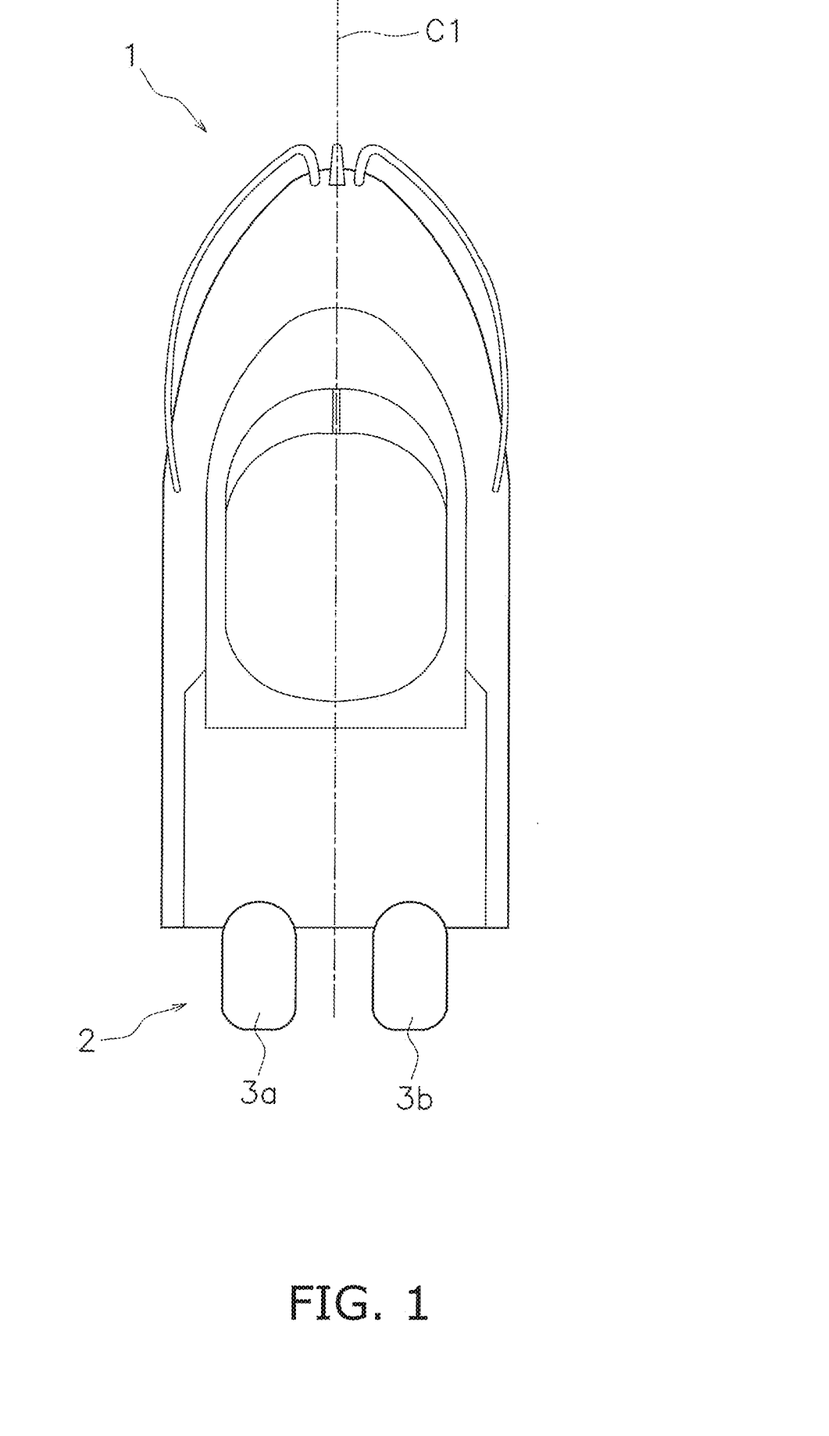
FIG. 1 is a top view of a vessel according to a preferred embodiment of the present invention.

Preferred embodiments of the present invention will be hereinafter explained with reference to the attached drawings. FIG. 1 is a top view of a vessel 1 according to a preferred embodiment of the present invention. A vessel steering system 2 according to a preferred embodiment of the present invention is installed in the vessel 1. As shown in FIG. 1, the vessel steering system 2 includes a plurality of propulsion devices 3a and 3b. The propulsion devices 3a and 3b are outboard motors, for example. Specifically, the vessel 1 includes a left propulsion device 3a and a right propulsion device 3b. It should be noted that in the following explanation, front, rear, right, left, up, and down directions are defined as meaning the front, rear, right, left, up, and down directions of the vessel 1, respectively.

The left and right propulsion devices 3a and 3b are attached to the stern of the vessel 1. The left and right propulsion devices 3a and 3b are disposed in alignment in the width direction of the vessel 1. Specifically, the left propulsion device 3a is disposed on the left side of a center line Cl extending in the back-and-forth direction of the vessel 1. The right propulsion device 3b is disposed on the right side of the center line Cl. Each propulsion device 3a and 3b generates a propulsive force to propel the vessel 1.

Figure 2:
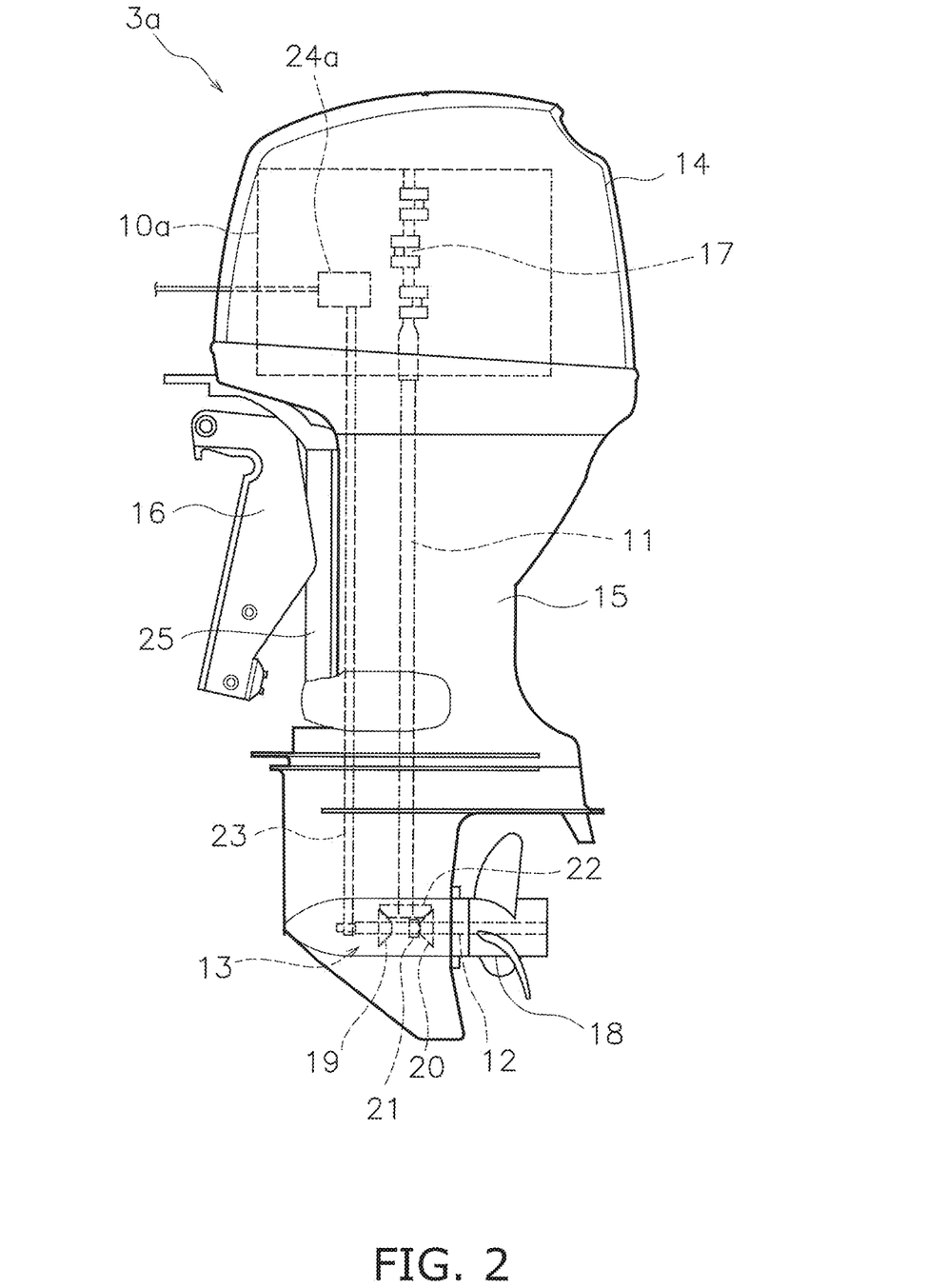
FIG. 2 is a side view of a left propulsion device.

FIG. 2 is a side view of the left propulsion device 3a. The left propulsion device 3a includes an engine 10a, a driveshaft 11, a propeller shaft 12, a shift mechanism 13, an engine cowl 14, a housing 15, and a bracket 16.

The engine 10a generates the propulsive force to propel the vessel 1. The engine 10a is disposed inside the engine cowl 14. The engine 10a includes a crankshaft 17. The crankshaft 17 extends in a vertical direction. The driveshaft 11 is connected to the crankshaft 17. The driveshaft 11 extends downward from the engine 10a. The propeller shaft 12 extends in a direction intersecting with the driveshaft 11. The propeller shaft 12 extends in the back-and-forth direction. The propeller shaft 12 is connected to the driveshaft 11 through the shift mechanism 13. A propeller 18 is connected to the propeller shaft 12.

The housing 15 is disposed directly below the engine cowl 14. The driveshaft 11, the propeller shaft 12, and the shift mechanism 13 are disposed inside the housing 15. The shift mechanism 13 switches the rotational direction of power to be transmitted from the driveshaft 11 to the propeller shaft 12. The shift mechanism 13 includes a forward moving gear 19, a rearward moving gear 20, and a clutch 21. The forward moving gear 19 and the rearward moving gear 20 are meshed with a bevel gear 22. The bevel gear 22 is attached to the driveshaft 11. The clutch 21 selectively causes either the forward moving gear 19 or the rearward moving gear 20 to be engaged with the propeller shaft 12. The clutch 21 is movable to a forward moving position, a rearward moving position, and a neutral position.

When set in the forward moving position, the clutch 21 causes the forward moving gear 19 to be engaged with the propeller shaft 12. Accordingly, the rotation of the driveshaft 11 is transmitted to the propeller shaft 12 so as to rotate the propeller shaft 12 in a forward moving direction. When set in the rearward moving position, the clutch 21 causes the rearward moving gear 20 to be engaged with the propeller shaft 12. Accordingly, the rotation of the driveshaft 11 is transmitted to the propeller shaft 12 so as to rotate the propeller shaft 12 in a rearward moving direction. When set in the neutral position, the clutch 21 causes both the forward moving gear 19 and the rearward moving gear 20 to be disengaged from the propeller shaft 12. Therefore, the rotation of the driveshaft 11 is not transmitted to the propeller shaft 12.

The left propulsion device 3a includes a shift member 23 and a shift actuator 24a. The shift member 23 is connected to the shift mechanism 13. The shift member 23 actuates the shift mechanism 13. More specifically, the shift member 23 is connected to the clutch 21. When driven by the shift actuator 24a, the shift member 23 moves the clutch 21 to one of the forward moving position, the rearward moving position, and the neutral position. The shift actuator 24a is connected to the shift member 23. The shift actuator 24a drives the shift member 23. The shift actuator 24a is, for instance, an electric motor. The shift actuator 24a drives the shift member 23 so as to switch the clutch 21 to one of the forward moving position, the rearward moving position, and the neutral position.

The bracket 16 attaches the left propulsion device 3a to the vessel 1. The left propulsion device 3a is detachably fixed to the stern of the vessel 1 through the bracket 16. The bracket 16 includes a steering shaft 25. The left propulsion device 3a is supported by the bracket 16 while being rotatable about the steering shaft 25.

Figure 3:
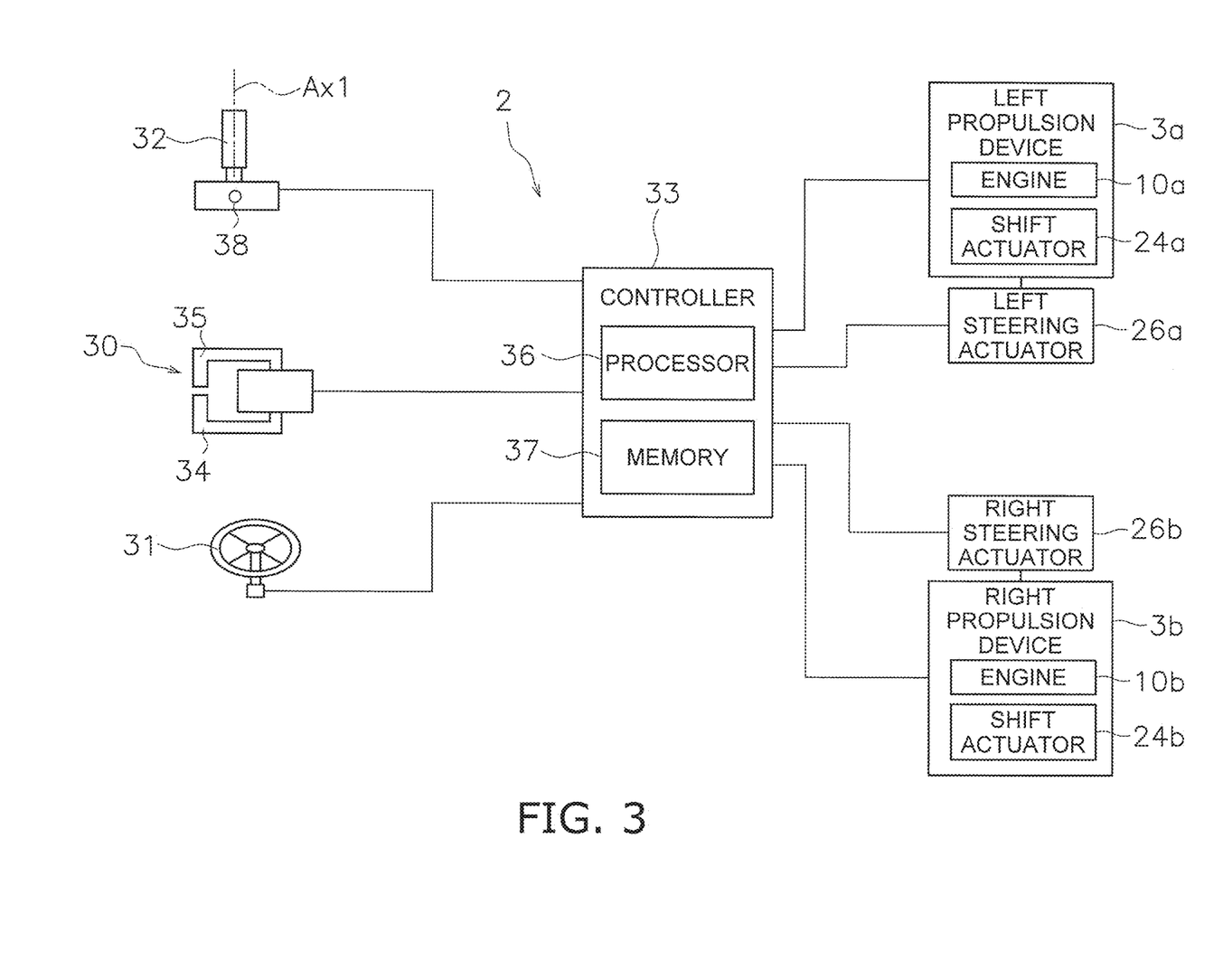
FIG. 3 is a schematic diagram showing a configuration of a vessel steering system according to a preferred embodiment of the present invention.

FIG. 3 is a schematic diagram showing a configuration of the vessel steering system 2. The right propulsion device 3b has a similar configuration to the left propulsion device 3a.

For example, as shown in FIG. 3, the right propulsion device 3*b* includes an engine 10*b* and a shift actuator 24*b*. The engine 10*b* and the shift actuator 24*b* in the right propulsion device 3*b* have similar configurations to the engine 10*a* and the shift actuator 24*a* in the left propulsion device 3*a*.

As shown in FIG. 3, the vessel steering system 2 includes a left steering actuator 26*a* and a right steering actuator 26*b*. The left steering actuator 26*a* is connected to the left propulsion device 3*a*. The left steering actuator 26*a* rotates the left propulsion device 3*a* about the steering shaft 25. Thus, the left steering actuator 26*a* changes the steering angle of the left propulsion device 3*a*. The left steering actuator 26*a* includes, for instance, a hydraulic cylinder. Alternatively, the left steering actuator 26*a* may include an electric cylinder or an electric motor.

The right steering actuator 26*b* is connected to the right propulsion device 3*b*. The right steering actuator 26*b* changes the steering angle of the right propulsion device 3*b*. The right steering actuator 26*b* has a similar configuration to the left steering actuator 26*a*.

As shown in FIG. 3, the vessel steering system 2 includes a remote control device 30, a steering device 31, a joystick 32, and a controller 33.

The remote control device 30 includes a first operating member 34 and a second operating member 35. The first operating member 34 is operated by a user to control the left propulsion device 3*a*. The first operating member 34 is, for instance, a lever. The first operating member 34 is operable to a forward moving position, a rearward moving position, and a neutral position. The remote control device 30 transmits a signal indicating an operation of the first operating member 34 to the controller 33.

The second operating member 35 is operated by the user to control the right propulsion device 3*b*. The second operating member 35 has a similar configuration to the first operating member 34. The remote control device 30 transmits the signal indicating an operation of the first operating member 34 to the controller 33. The remote control device 30 transmits a signal indicating an operation of the second operating member 35 to the controller 33.

The steering device 31 is, for instance, a steering wheel. The steering device 31 is operated by the user to control the steering angles of the left and right propulsion devices 3*a* and 3*b*. The steering device 31 is operable to a left turn position, a right turn position, and a neutral position. The steering device 31 transmits a signal indicating an operation of the steering device 31 to the controller 33.

The joystick 32 is operable in a tiltable manner. The joystick 32 is operable in front, rear, right, and left directions and oblique directions therebetween. The joystick 32 is operable 360 degrees in all the directions about a rotational axis Ax1 of the joystick 32. Additionally, the joystick 32 is operable by being twisted about the rotational axis Ax1.

The joystick 32 transmits a signal indicating the position of the joystick 32 to the controller 33. The position of the joystick 32 indicates the tilt direction and the tilt amount of the joystick 32. Additionally, the position of the joystick 32 indicates the twist direction and the twist amount of the joystick 32.

The controller 33 includes a processor 36 and a memory 37. The memory 37 includes a volatile memory such as a RAM. The memory 37 includes a non-volatile memory such as a ROM. The controller 33 may include an auxiliary storage device such as an HDD or an SSD. The memory 37 stores programs and data to control the left and right propulsion devices 3*a* and 3*b* and the left and right steering actuators 26*a* and 26*b*. The processor 36 is a CPU (Central Processing Unit), for instance, and executes processes to control the left and right propulsion devices 3*a* and 3*b* and the left and right steering actuators 26*a* and 26*b* in accordance with the programs.

The controller 33 controls the left and right propulsion devices 3*a* and 3*b* and the left and right steering actuators 26*a* and 26*b* based on the signals transmitted thereto from the steering device 31, the remote control device 30, and the joystick 32. More specifically, the controller 33 controls the direction and the magnitude of the propulsive force of the left propulsion device 3*a* in accordance with the position of the first operating member 34. The controller 33 controls the shift actuator 24*a* in accordance with the position of the first operating member 34. Accordingly, the clutch 21 of the shift mechanism 13 is switched among the forward moving position, the rearward moving position, and the neutral position. As a result, the direction of the propulsive force of the left propulsion device 3*a* is switched among forward, rearward, and neutral. Moreover, the controller 33 controls the magnitude of the propulsive force of the left propulsion device 3*a* in accordance with the position of the first operating member 34. The controller 33 controls the magnitude of the propulsive force of the left propulsion device 3*a* by, for instance, controlling the throttle opening degree of the engine 10*a*.

The controller 33 controls the direction and the magnitude of the propulsive force of the right propulsion device 3*b* in accordance with the position of the second operating member 35. The controller 33 controls the shift actuator 24*b* in accordance with the position of the second operating member 35. Accordingly, similarly to the left propulsion device 3*a*, the direction of the propulsive force of the right propulsion device 3*b* is switched among forward, rearward, and neutral. Moreover, the controller 33 controls the magnitude of the propulsive force of the right propulsion device 3*b* in accordance with the position of the second operating member 35. The controller 33 controls the magnitude of the propulsive force of the right propulsion device 3*b* by, for instance, controlling the throttle opening degree of the engine 10*b*.

The controller 33 controls the left and right steering actuators 26*a* and 26*b* in accordance with the position of the steering device 31. Accordingly, the steering angles of the left and right propulsion devices 3*a* and 3*b* are controlled. As a result, the turn direction of the vessel 1 is controlled.

The controller 33 controls the left and right propulsion devices 3*a* and 3*b* and the left and right steering actuators 26*a* and 26*b* in accordance with the position of the joystick 32. The controller 33 controls the propulsive forces and the steering angles of the left and right propulsion devices 3*a* and 3*b* such that the vessel 1 performs a translational motion in a direction corresponding to the tilt direction of the joystick 32.

Figure 4:
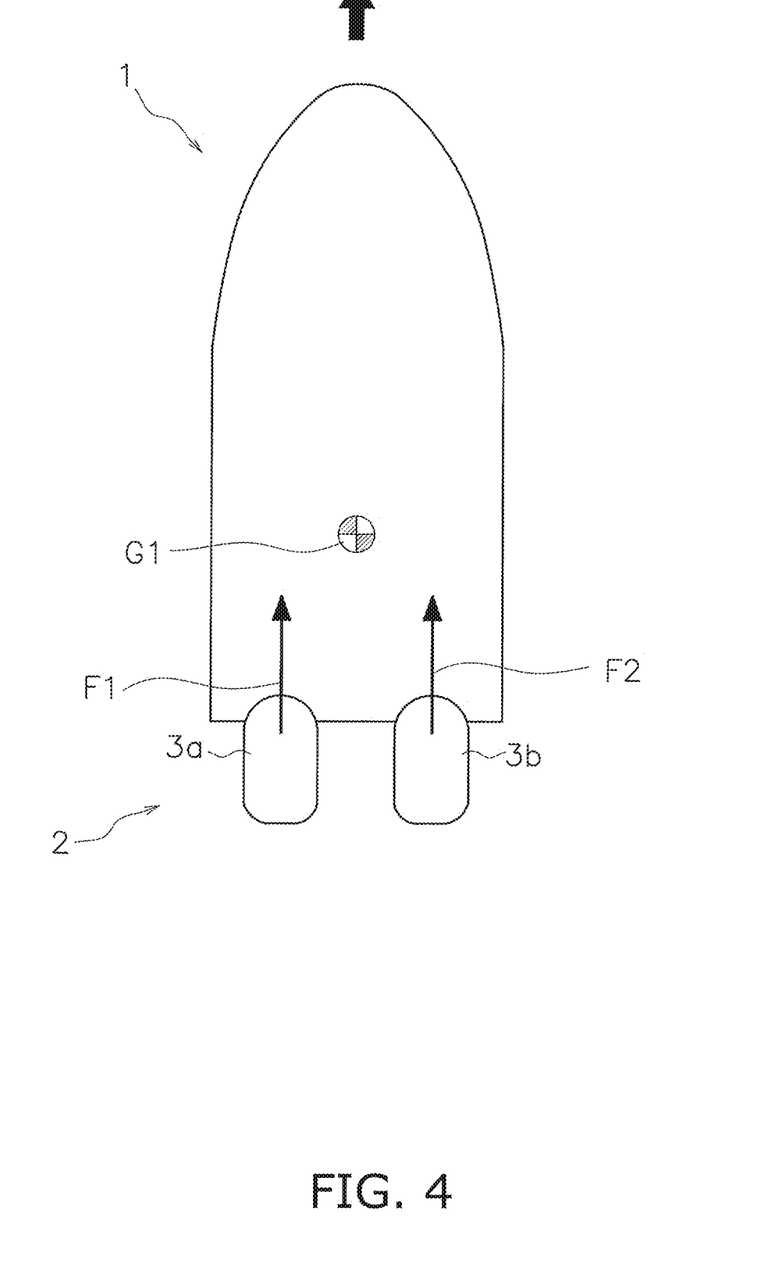
FIG. 4 is a diagram showing propulsive forces in a back-and-forth moving mode.

More specifically, when the tilt direction of the joystick 32 is the back-and-forth direction, the controller 33 controls the propulsion devices 3*a* and 3*b* and the steering actuators 26*a* and 26*b* in a back-and-forth moving mode. FIG. 4 is a diagram showing propulsive forces to be generated in the back-and-forth moving mode. As shown in FIG. 4, when the tilt direction of the joystick 32 is the front direction, the controller 33 sets the propulsion devices 3*a* and 3*b* to be oriented parallel to the back-and-forth direction. Additionally, the controller 33 sets both the propulsion devices 3*a* and 3*b* to a forward moving state, and sets the magnitudes of the propulsive forces of the propulsion devices 3*a* and 3*b* to be equal. Accordingly, the vessel 1 is moved in the forward direction. When the tilt direction of the joystick 32 is the rear direction, the controller 33 controls the propulsion devices 3a and 3b directionally back-and-forth opposite to the above-described operation.

Figure 5:
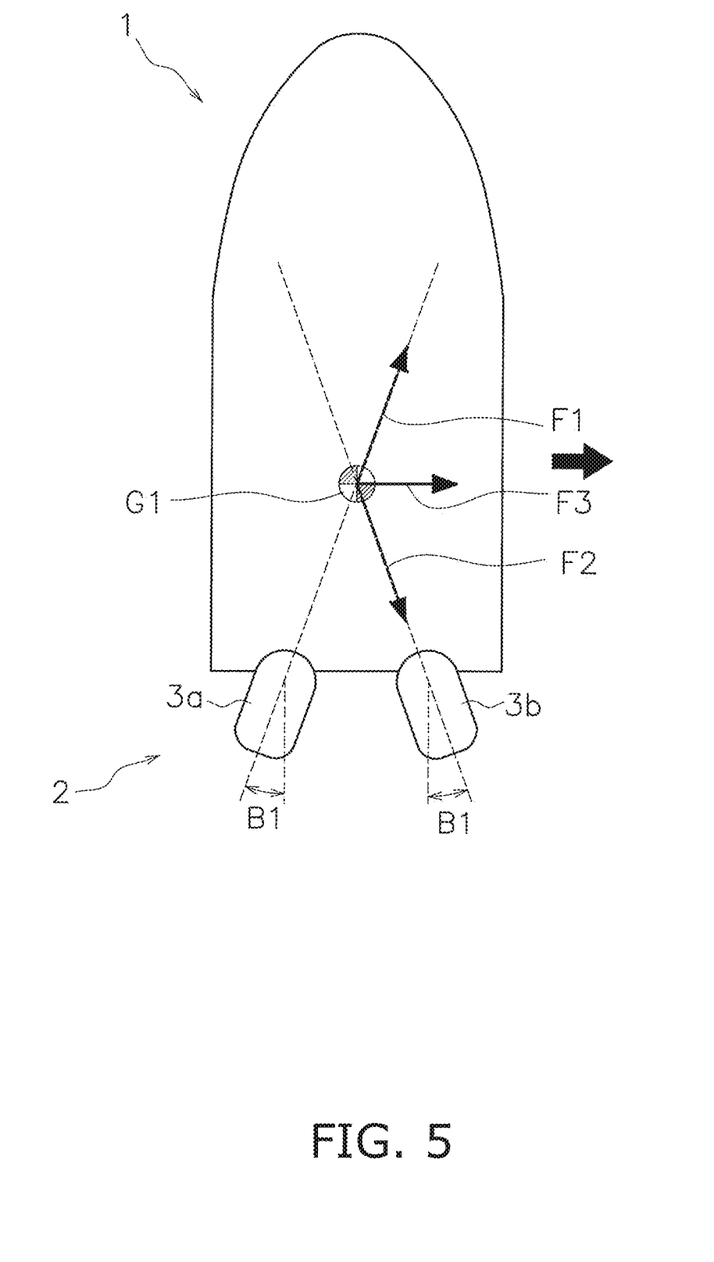
FIG. 5 is a diagram showing the propulsive forces in a transverse moving mode.

When the tilt direction of the joystick 32 includes a vector related to a right-and-left direction, the controller 33 controls the propulsion devices 3a and 3b and the steering actuators 26a and 26b in a transverse moving mode. FIG. 5 is a diagram showing propulsive forces to be generated in the transverse moving mode.

As shown in FIG. 5, the controller 33 sets the steering angle of the left propulsion device 3a and that of the right propulsion device 3b such that the left and right propulsion devices 3a and 3b are oriented bilaterally opposite to each other such that each is slanted at a predetermined angle B1 with respect to the back-and-forth direction. The controller 33 controls the propulsive forces of the left and right propulsion devices 3a and 3b such that a net force F3 is oriented in a direction corresponding to the tilt direction of the joystick 32. The net force F3 is a net force of a propulsive force F1 of the left propulsion device 3a and a propulsive force F2 of the right propulsion device 3b. The above-described predetermined angle B1 is set such that a line of action of the net force F3 passes through a center of gravity G1 of the vessel 1.

More specifically, when the tilt direction of the joystick 32 is the right direction, the controller 33 sets the left propulsion device 3a to the forward moving state while setting the right propulsion device 3b to the rearward moving state. Additionally, the controller 33 sets the magnitude of the propulsive force F1 of the left propulsion device 3a and that of the propulsive force F2 of the right propulsion device 3b to be equal. Accordingly, the net force F3 is oriented in the right direction. As a result, the vessel 1 is moved in the right direction.

When the tilt direction of the joystick 32 is the left direction, contrary to the above-described settings, the controller 33 sets the left propulsion device 3a to the rearward moving state while setting the right propulsion device 3b to the forward moving state. Additionally, the controller 33 sets the magnitude of the propulsive force F1 of the left propulsion device 3a and that of the propulsive force F2 of the right propulsion device 3b to be equal. Accordingly, the net force F3 is oriented in the left direction. As a result, the vessel 1 is moved in the left direction.

Figure 6:
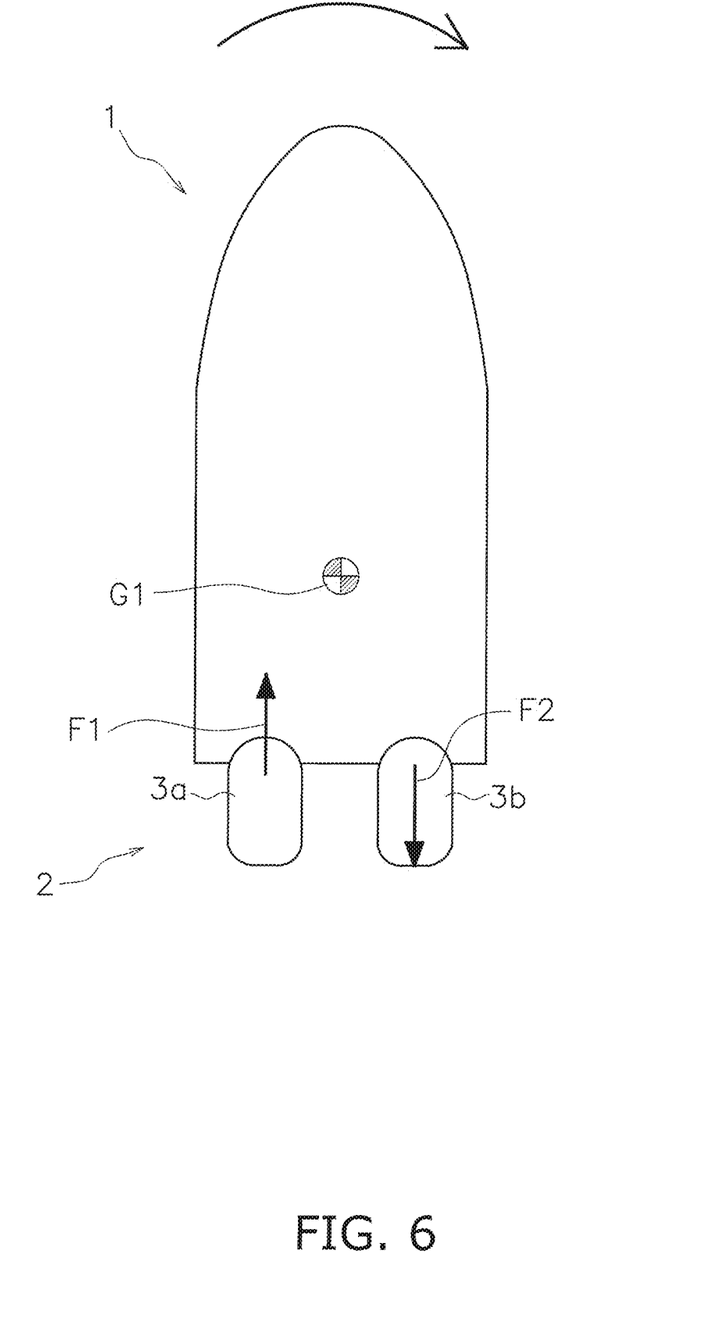
FIG. 6 is a diagram showing the propulsive forces in a bow turning mode.

When the joystick 32 is twisted in a neutral position, the controller 33 controls the propulsion devices 3a and 3b in a bow turning mode. In the bow turning mode, the controller 33 controls the propulsive forces and the steering angles of the propulsion devices 3a and 3b such that the vessel 1 turns the bow thereof in a direction corresponding to the twist direction of the joystick 32. FIG. 6 is a diagram showing propulsive forces to be generated in the bow turning mode. As shown in FIG. 6, the controller 33 sets the steering angles of the left and right propulsion devices 3a and 3b such that the left and right propulsion device 3a and 3b are oriented parallel to the back-and-forth direction. The controller 33 sets the propulsive forces of the left and right propulsion devices 3a and 3b to be oriented back-and-forth directionally opposite to each other.

More specifically, when the twist direction of the joystick 32 is the clockwise direction, the controller 33 sets the left propulsion device 3a to the forward moving state while setting the right propulsion device 3b to the rearward moving state. Additionally, the controller 33 sets the magnitude of the propulsive force F1 of the left propulsion device 3a and that of the propulsive force F2 of the right propulsion device 3b to be equal. Accordingly, the vessel 1 turns the bow thereof in the clockwise direction.

When the twist direction of the joystick 32 is the counterclockwise direction, contrary to the above-described settings, the controller 33 sets the left propulsion device 3a to the rearward moving state while setting the right propulsion device 3b to the forward moving state. Additionally, the controller 33 sets the magnitude of the propulsive force F1 of the left propulsion device 3a and that of the propulsive force F2 of the right propulsion device 3b to be equal. Accordingly, the vessel 1 turns the bow thereof in the counterclockwise direction.

Chances are that in the transverse moving mode described above, the vessel 1 is moved in a direction displaced from the direction corresponding to the tilt direction of the joystick 32. Other than this, chances are that although the joystick 32 is tilted without being twisted, the vessel 1 is moved while turning the bow thereof. In such a situation, when the user performs calibration, the behavior of the vessel 1 is modified with respect to operating the joystick 32. A series of processes for performing calibration will be hereinafter explained.

Figure 7:
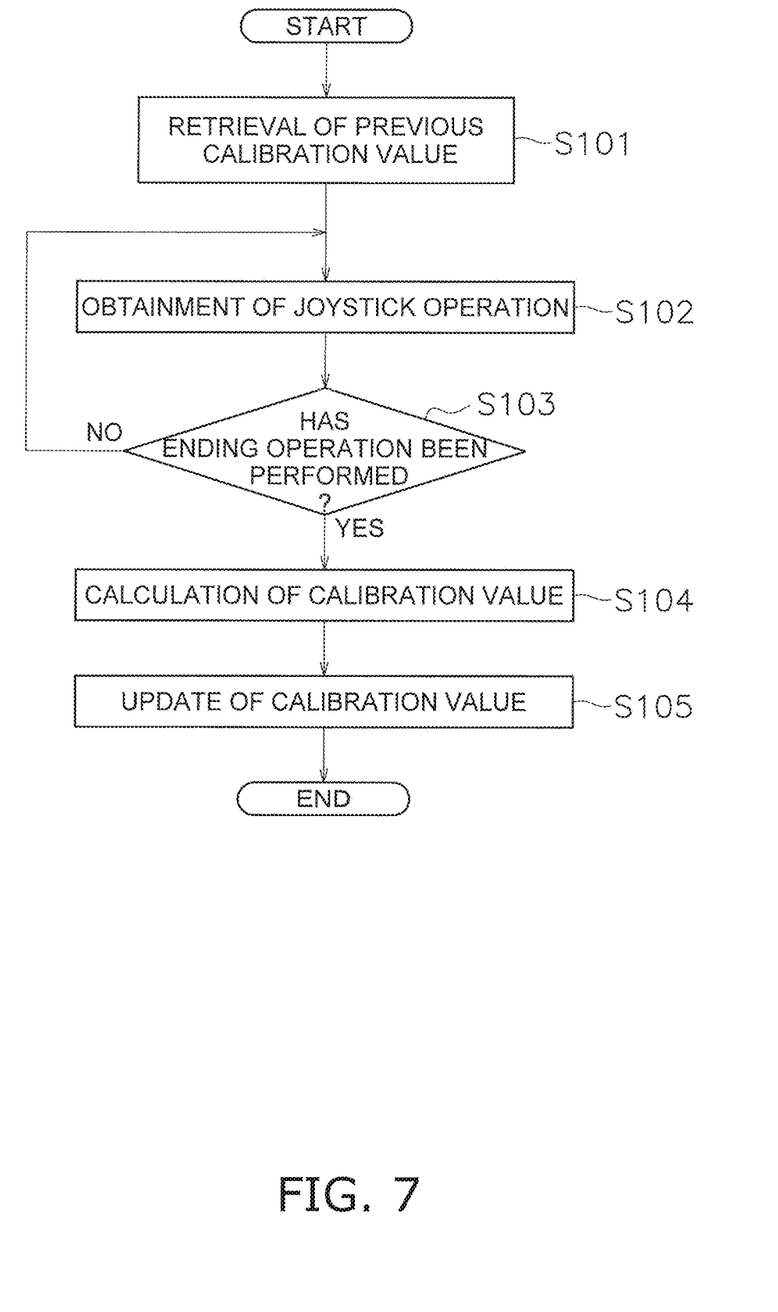
FIG. 7 is a flowchart showing a series of processes for calibration.

FIG. 7 is a flowchart showing a series of processes for performing calibration. Upon receiving a command to start calibration, the controller 33 executes a series of processes to perform calibration. The command to start calibration may be outputted to the controller 33 when the user operates an input 38. As shown in FIG. 3, the input 38 may be provided on the joystick 32. Alternatively, the input 38 may be provided in a position other than the joystick 32. The input 38 is, for instance, a switch. However, the input device 38 may be another type of device such as a touchscreen.

As shown in FIG. 7, in step S101, the controller 33 retrieves a calibration value from a previous calibration. The calibration value includes a propulsive force ratio and the steering angle (predetermined angle B1) of each propulsion device 3a, 3b in the transverse moving mode. A propulsive force generated in the forward moving state and that generated in the rearward moving state are different in magnitude even when a throttle opening degree to be commanded to the engine 10a, 10b is equal in magnitude between the both moving states. The propulsive force ratio indicates a ratio of the propulsive force generated in the forward moving state and that generated in the rearward moving state. The previous calibration value is stored in the memory 37.

Figure 8:
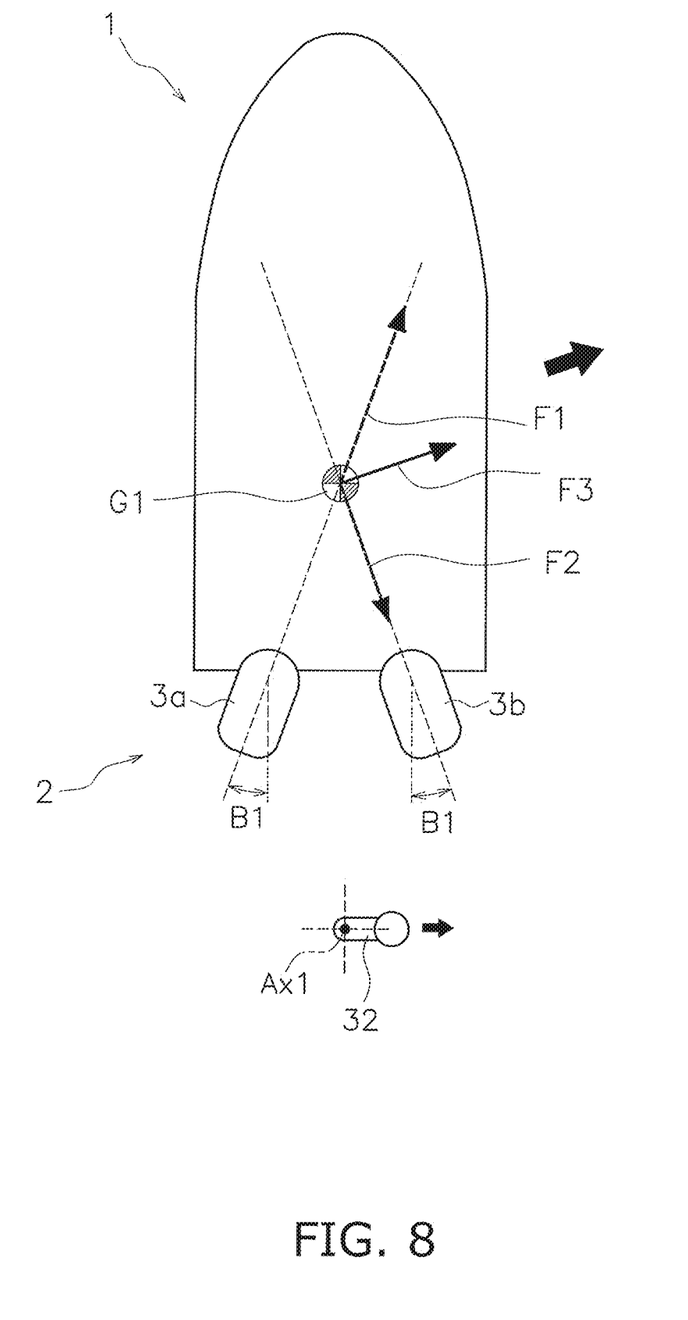
FIG. 8 is a diagram showing an operation of a joystick and the propulsive forces before calibration.

As shown in FIG. 5, when the joystick 32 is tilted in the right or left direction, the controller 33 determines a target output of the engine 10a, 10b based on the propulsive force ratio such that the propulsive force (F1) generated in the forward moving state and the propulsive force (F2) generated in the rearward moving state are equal in magnitude. However, when the propulsive force ratio is different from an appropriate value, the magnitude of the propulsive force (F1) generated in the forward moving state and that of the propulsive force (F2) generated in the rearward moving state are inevitably made different from each other. Because of this, the vessel 1 is inevitably moved in a direction displaced from the tilt direction of the joystick 32. For example, as shown in FIG. 8, when the joystick 32 is tilted in the right direction, the propulsive force F1 of the left propulsion device 3a is greater in magnitude than the propulsive force F2 of the right propulsion device 3b. In this case, the net force F3 is displaced in the right front direction, such that the vessel 1 is inevitably moved in the right front direction.

Figure 9:
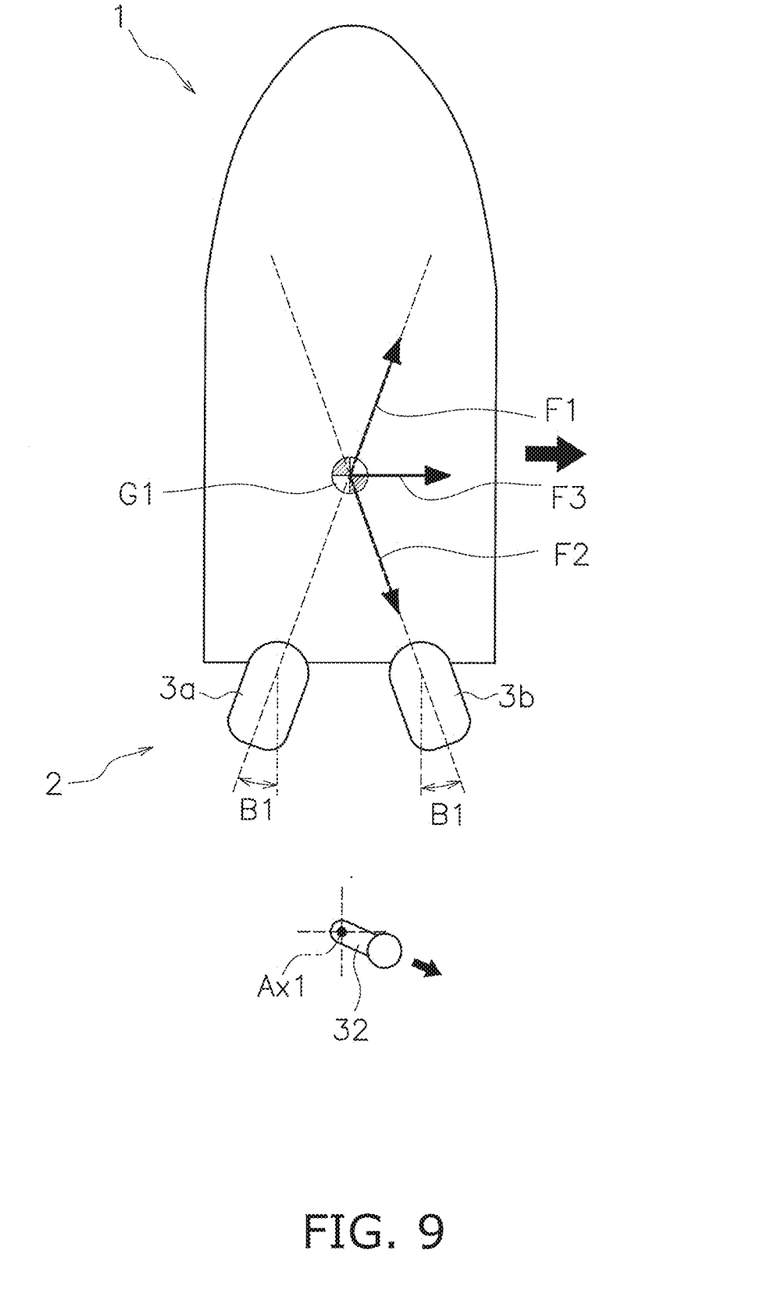
FIG. 9 is a diagram showing the operation of the joystick and the propulsive forces during calibration.

As shown in FIG. 9, during calibration, the user tilts the joystick 32 such that the vessel 1 is moved in the right direction. For example, when the vessel 1 is moved in the right front direction while the joystick 32 is being tilted in the right direction, the moving direction of the vessel 1 is modified to the right direction by tilting the joystick 32 in the right rear direction. When the vessel 1 is moved in the right rear direction while the joystick 32 is being tilted in the right direction, the moving direction of the vessel 1 is modified to the right direction by tilting the joystick 32 in the right front direction. Likewise, when the joystick 32 is being tilted in the left direction, the moving direction of the vessel 1 is similarly modified by operating the joystick 32 bilaterally symmetrically to the operation described above.

Figure 10:
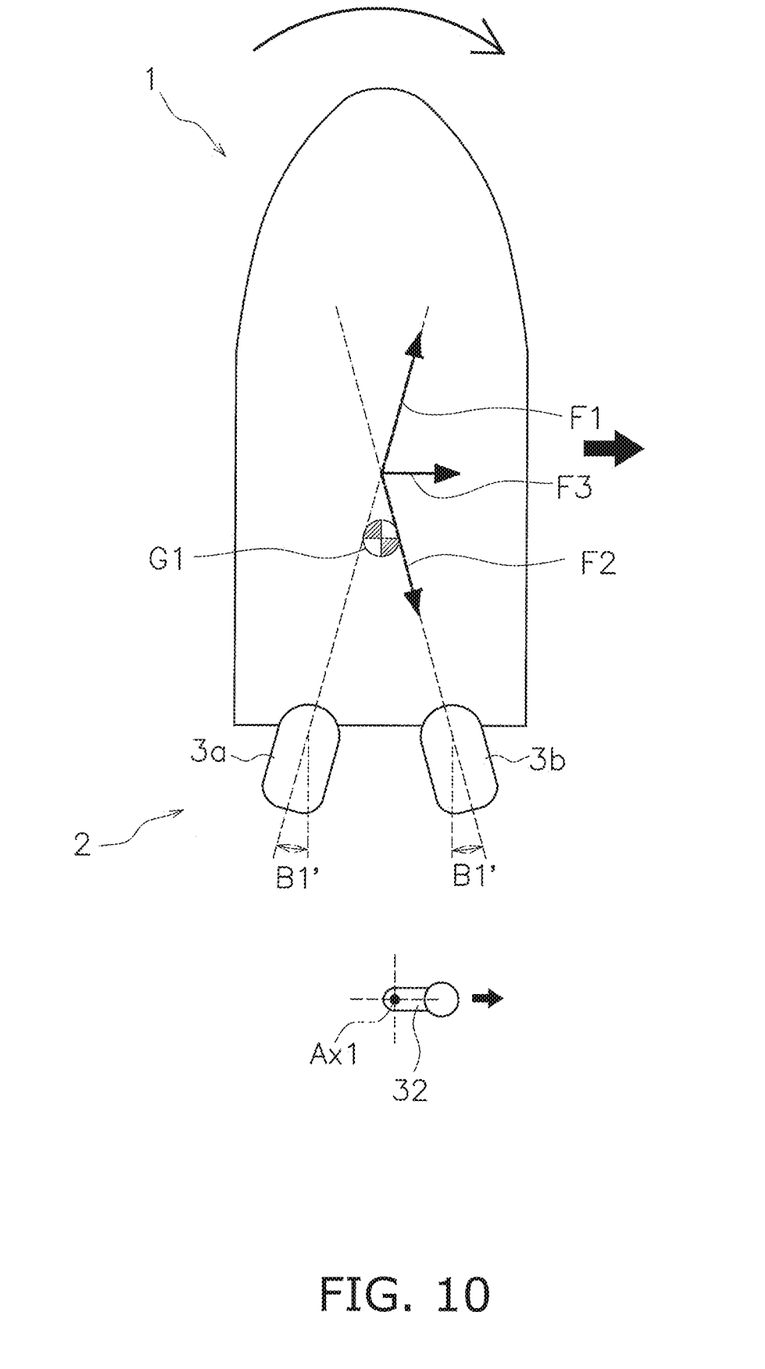
FIG. 10 is a diagram showing the operation of the joystick and the propulsive forces before calibration.

As shown in FIG. 10, when the actual steering angle of each propulsion device 3a, 3b in the transverse moving mode has a value B' different from the value B1 of the predetermined angle, the net force F3 acts in a direction not passing through the center of gravity G1, although the joystick 32 is being tilted in the right direction without being twisted. Because of this, the vessel 1 is inevitably moved in the right direction while turning the bow thereof.

Figure 11:
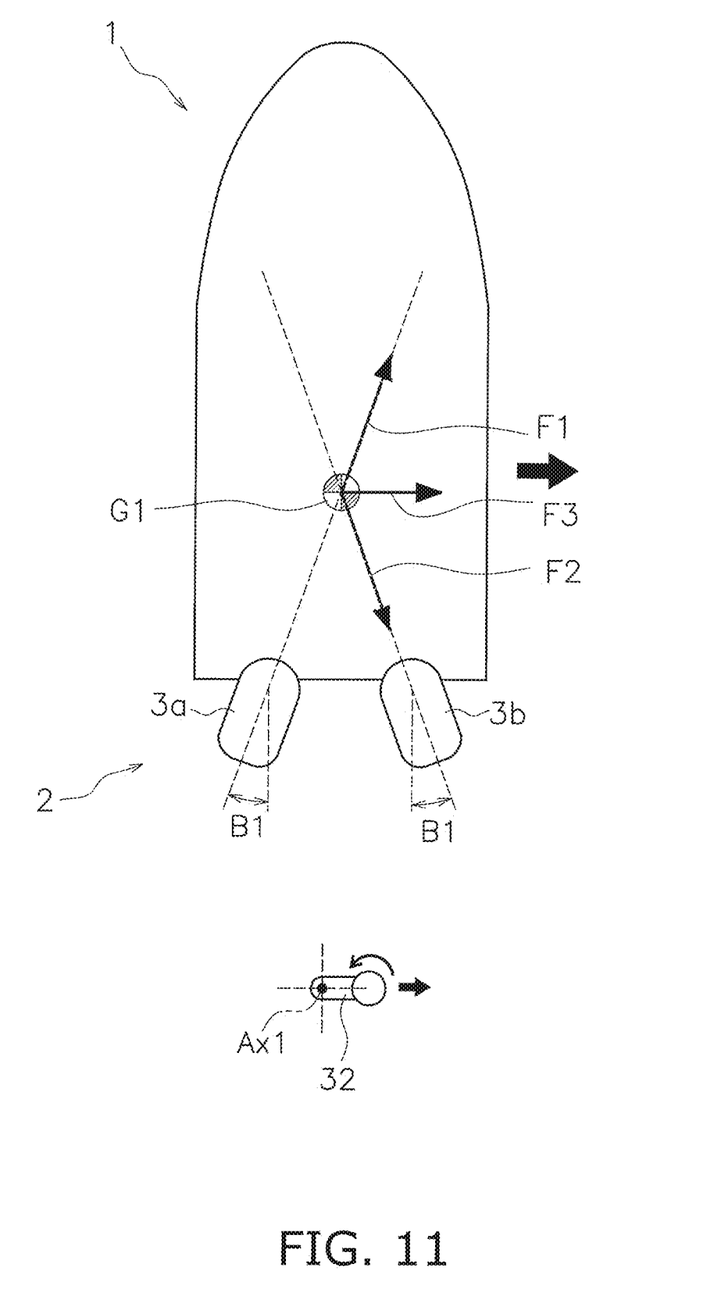
FIG. 11 is a diagram showing the operation of the joystick and the propulsive forces during calibration.

As shown in FIG. 11, during calibration, the user tilts the joystick 32 while twisting the joystick 32 such that the vessel 1 is moved in the right direction without turning the bow thereof. For example, when the vessel 1 turns the bow thereof in the clockwise direction, the user twists the joystick 32 in the counterclockwise direction. When the vessel 1 turns the bow thereof in the counterclockwise direction, the user twists the joystick 32 in the clockwise direction. Accordingly, the steering angle of each propulsion device 3a, 3b is modified, such that the vessel 1 is inhibited from turning the bow thereof.

As shown in FIG. 7, in step S102, the controller 33 obtains an operation performed on the joystick 32 during the calibration described above. In step S103, the controller 33 determines whether or not an ending operation has been performed. When the user has performed an operation to end calibration using the input 38, the controller 33 determines that the ending operation has been performed. When it is determined that the ending operation has been performed, the process proceeds to step S104.

In step S104, the controller 33 calculates a calibration value. The controller 33 calculates the calibration value based on the operation performed on the joystick 3 at the point in time when it was determined that the ending operation has been performed. The controller 33 calculates, as a correction value, an appropriate value for the propulsive force ratio based on a differential between the actual tilt direction of the joystick 32 during calibration and the transverse direction of the joystick 32. With use of the correction value of the propulsive force ratio, the controller 33 appropriately corrects the magnitude of the propulsive force of the left propulsion device 3a and that of the propulsive force of the right propulsion device 3b.

Additionally, based on the above-described operation performed on the joystick 32, the controller 33 calculates, as a correction value, an appropriate command value for the steering angle of each propulsion device 3a, 3b in the transverse moving mode. The controller 33 calculates the correction value of the steering angle of each propulsion device 3a, 3b based on the twist direction and the twist amount of the joystick 32.

In step S105, the controller 33 updates the calibration value and stores the updated value. The controller 33 updates the value of the propulsive force ratio to the correction value thereof calculated in step S104 and stores the updated value. The controller 33 updates the value of the steering angle to the correction value thereof calculated in step S104 and stores the updated value.

When calibration is performed the next time, the controller 33 repeatedly executes the above-described process steps S101 to S105. Therefore, the controller 33 further performs calibration with respect to the previous calibration value. In other words, the controller 33 additionally performs calibration for the left and right propulsion devices 3a and 3b to which the calibration has been previously applied.

In the vessel steering system 2 according to the preferred embodiments explained above, when performing calibration the next time, the controller 33 additionally performs a calibration for the left and right propulsion devices 3a and 3b to which the calibration has been previously applied. Because of this, when the amount of displacement remaining after the previous calibration is small, calibration is performed with a simple work.

Figure 12A:
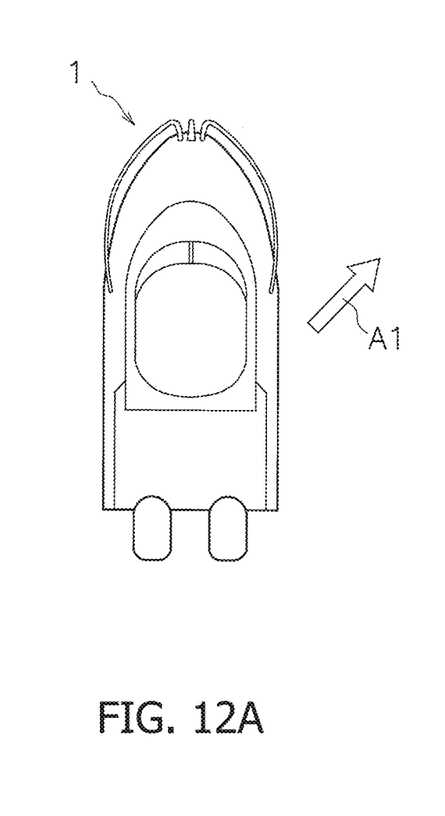
FIGS. 12A to 12C are diagrams showing a motion of the vessel while repeatedly performing calibration.
Figure 12B:
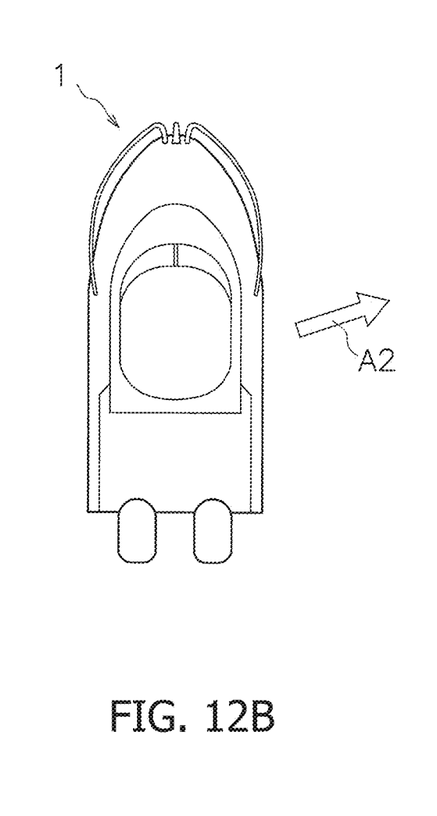
Figure 12C:
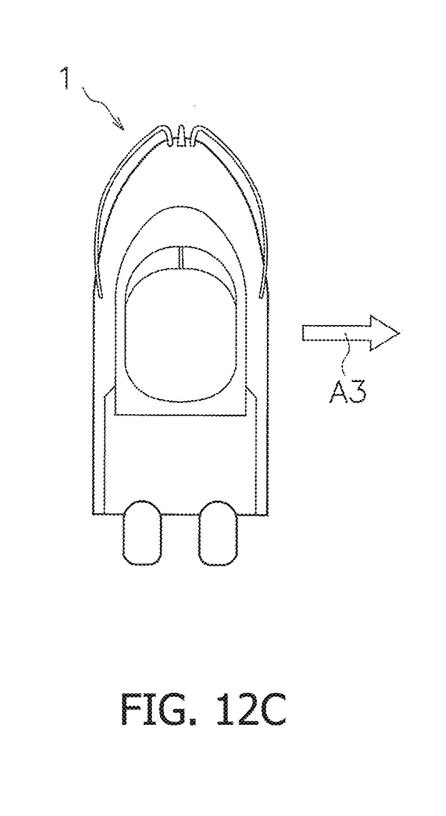

In contrast, even when the amount of displacement remaining after the previous calibration is large, such displacement is appropriately corrected by repeatedly performing the calibration. For example, as indicated with arrow A1 in FIG. 12A, when a large displacement is produced in the moving direction of the vessel 1, it is difficult to completely calibrate the displacement with a one-time calibration. Because of this, as indicated with arrow A2 in FIG. 12B, displacement remains in the moving direction of the vessel 1 even after the first calibration. However, the displacement is gradually reduced by repeatedly performing the calibration. Consequently, as indicated with arrow A3 in FIG. 12C, the displacement is appropriately corrected.

Preferred embodiments of the present invention have been explained above. However, the present invention is not limited to the above-described preferred embodiments, and a variety of changes can be made without departing from the gist of the present invention.

The number of propulsion devices is not limited to two, and may be greater than two. The propulsion devices are not limited to outboard motors, and may be another type of propulsion device such as inboard-outboard motors. The configuration of each propulsion device is not limited to that in the above-described preferred embodiments, and may be changed.

The controller 33 is not limited to a single device, and may include a plurality of controllers. The above-described processes executed during calibration may be decentralized to and executed by the plurality of controllers.

In the above-described preferred embodiments, the calibration performed in the transverse moving mode has been explained. However, the controller 33 may perform calibration in another moving mode. For example, the controller 33 may execute calibration in the back-and-forth moving mode. The user moves the vessel 1 in the back-and-forth direction by tilting the joystick 32 in the back-and-forth direction. At this time, the user twists the joystick 32 such that the vessel 1 is straightly moved. When the joystick 32 is twisted in the back-and-forth moving mode, the controller 33 controls the steering angle of each propulsion device 3a, 3b such that the bow direction of the vessel 1 is changed in accordance with the twist direction and the twist amount of the joystick 32. During calibration, the controller 33 calculates a correction value of the steering angle based on the actual twist direction and the actual twist amount of the joystick 32. Alternatively, the user may tilt the joystick 32 in a direction that slants with respect to the back-and-forth direction such that the vessel 1 is straightly moved. The controller 33 may calculate the correction value of the steering angle based on a differential between the actual tilt direction of the joystick 32 and the back-and-forth direction of the joystick 32.

The controller 33 may perform calibration in the bow turning mode. The user tilts the joystick 32 in the back-and-forth direction while twisting the joystick 32 such that the vessel 1 turns the bow thereof on the spot. The controller 33 may calculate a correction value of the propulsive force ratio based on the actual tilt direction and the actual tilt amount of the joystick 32. Alternatively, the controller 33 may calculate a correction value of the steering angle of each propulsion device 3a, 3b based on the actual tilt direction and the actual tilt amount of the joystick 32.

It should be noted that when a calibration value has been already obtained in the transverse moving mode in starting calibration in either the bow turning mode or the back-and-forth moving mode, the controller 33 may additionally perform calibration with respect to the calibration value obtained in the transverse moving mode. Moreover, the controller 33 may store a calibration value to be obtained by additionally performing the calibration.

The series of processes executed during calibration is not limited to that in the above-described preferred embodiments, and may be changed. For example, the series of processes described above may be changed or omitted in part. The calibration value is not limited to the propulsive force ratio, and may be another value. For example, the calibration value may be a correction coefficient of the target output of the engine. The calibration value may be a correction coefficient of the steering angle.

According to preferred embodiments of the present invention, a displacement between a tilt direction of a joystick and a moving direction of a vessel is appropriately corrected by calibration while the calibration is performed with a simple work.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for steering a vessel, the system comprising:
   a left propulsion device;
   a left actuator connected to the left propulsion device to change a steering angle of the left propulsion device;
   a right propulsion device;
   a right actuator connected to the right propulsion device to change a steering angle of the right propulsion device;
   a joystick operable in a tiltable manner; and
   a controller configured or programmed to:
      receive a signal indicating a tilt direction of the joystick when the joystick is tilted in a transverse direction;
      set the steering angles of the right and left propulsion devices such that the right and left propulsion devices are oriented bilaterally opposite to each other such that each is slanted with respect to a back-and-forth direction of the vessel;
      control a propulsive force of the left propulsion device and a propulsive force of the right propulsion device such that a net force of the propulsive forces of the right and left propulsion devices is oriented in a direction corresponding to the tilt direction of the joystick;
      upon receipt of a command to start calibration, perform the calibration for the right and left propulsion devices such that the tilt direction of the joystick is matched with a moving direction of the vessel; and
      when performing a subsequent calibration, additionally perform the calibration for the right and left propulsion devices to which the calibration has been previously applied.

2. The system for steering the vessel according to claim 1, wherein the controller is configured or programmed to:
   obtain an actual tilt direction of the joystick that moves the vessel in the transverse direction during the calibration; and
   perform the calibration for the right and left propulsion devices based on a differential between the actual tilt direction of the joystick and the transverse direction of the joystick.

3. The system for steering the vessel according to claim 1, wherein the controller is configured or programmed to:
   when the joystick is tilted in the back and-forth direction, control the propulsive forces of the right and left propulsion devices to be oriented in the back-and-forth direction in accordance with the tilt direction of the joystick;
   upon receipt of the command to start the calibration, the controller obtains an actual operating direction of the joystick that moves the vessel in the back-and-forth direction; and
   perform the calibration for the right and left propulsion devices based on the actual operating direction of the joystick.

4. The system for steering the vessel according to claim 1, wherein the controller is configured or programmed to:
   when the joystick is twisted, set the propulsive forces of the right and left propulsion devices to be oriented back-and-forth directionally opposite to each other such that the vessel turns a bow thereof in a twist direction of the joystick;
   upon receipt of the command to start the calibration, obtain an actual twist direction and an actual tilt direction of the joystick that causes the vessel to turn the bow thereof; and
   perform the calibration for the right and left propulsion devices based on the actual tilt direction of the joystick.

5. The system for steering the vessel according to claim 1, wherein the controller is configured or programmed to calculate and store correction values for the steering angles of the right and left propulsion devices during the calibration.

6. The system for steering the vessel according to claim 1, wherein the controller is configured or programmed to calculate and store correction values for the propulsive forces of the right and left propulsion devices during the calibration.

7. A method executed by a controller to steer a vessel including a left propulsion device and a right propulsion device, the method comprising:
   receiving a signal indicating a tilt direction of a joystick;
   when the joystick is tilted in a transverse direction, setting a steering angle of the left propulsion device and a steering angle of the right propulsion device such that the right and left propulsion devices are oriented bilaterally opposite to each other such that each is slanted with respect to a back-and-forth direction of the vessel, and controlling a propulsive force of the left propulsion device and a propulsive force of the right propulsion device such that a net force of the propulsive forces of the right and left propulsion devices is oriented in a direction corresponding to the tilt direction of the joystick;

upon receiving a command to start calibration, performing the calibration for the right and left propulsion devices such that the tilt direction of the joystick is matched with a moving direction of the vessel; and during a subsequent calibration, additionally performing the calibration for the right and left propulsion devices to which the calibration has been previously applied.

8. The method according to claim 7, wherein the step of performing the calibration includes:

obtaining an actual tilt direction of the joystick that moves the vessel in the transverse direction; and performing the calibration for the right and left propulsion devices based on a differential between the actual tilt direction of the joystick and the transverse direction of the joystick.

9. The method according to claim 7, further comprising:

when the joystick is tilted in the back-and-forth direction, controlling the propulsive forces of the right and left propulsion devices to be oriented in the back-and-forth direction in accordance with the tilt direction of the joystick;

upon receiving the command to start the calibration, obtaining an actual operating direction of the joystick that moves the vessel in the back-and-forth direction; and performing the calibration for the right and left propulsion devices based on the actual operating direction of the joystick.

10. The method according to claim 7, further comprising:

when the joystick is twisted, setting the propulsive forces of the right and left propulsion devices to be oriented back-and-forth directionally opposite to each other such that the vessel turns a bow thereof in a twist direction of the joystick;

upon receipt of the command to start the calibration, obtaining an actual twist direction and an actual tilt direction of the joystick that causes the vessel to turn the bow thereof; and performing the calibration for the right and left propulsion devices based on the actual tilt direction of the joystick.

11. The method according to claim 7, wherein the step of performing the calibration includes calculating and storing correction values for the steering angles of the right and left propulsion devices.

12. The method according to claim 7, wherein the step of performing the calibration includes calculating and storing correction values for the propulsive forces of the right and left propulsion devices.

* * * * *